(12) United States Patent
Slotta et al.

(10) Patent No.: US 9,806,349 B2
(45) Date of Patent: Oct. 31, 2017

(54) ACTIVATION DEVICE FOR AN ELECTRIC BATTERY UNIT AND ELECTRIC BATTERY UNIT WITH AT LEAST ONE ACTIVATION DEVICE

(71) Applicant: ATLAS ELEKTRONIK GmbH, Bremen (DE)

(72) Inventors: Norbert Slotta, Stade (DE); Volker Rieken, Uetersen (DE)

(73) Assignee: ATLAS ELEKTRONIK GmbH, Bremen (DE)

(*) Notice: Subject to any disclaimer, the term of this patent is extended or adjusted under 35 U.S.C. 154(b) by 267 days.

(21) Appl. No.: 14/404,236

(22) PCT Filed: Apr. 18, 2013

(86) PCT No.: PCT/DE2013/100141
§ 371 (c)(1),
(2) Date: Nov. 26, 2014

(87) PCT Pub. No.: WO2013/185750
PCT Pub. Date: Dec. 19, 2013

(65) Prior Publication Data
US 2015/0111081 A1    Apr. 23, 2015

(30) Foreign Application Priority Data
Jun. 16, 2012   (DE) .................. 10 2012 011 986

(51) Int. Cl.
*H01M 6/32* (2006.01)
*H01M 6/38* (2006.01)
(Continued)

(52) U.S. Cl.
CPC ............ *H01M 6/32* (2013.01); *F16K 17/403* (2013.01); *F42B 19/00* (2013.01); *F42B 19/24* (2013.01);
(Continued)

(58) Field of Classification Search
CPC . H01M 6/32; H01M 6/38; F42B 19/00; F16K 17/40
(Continued)

(56) References Cited

U.S. PATENT DOCUMENTS 2,798,111 A    7/1957  Renke
3,236,697 A    2/1966  Amiet et al.
(Continued)

FOREIGN PATENT DOCUMENTS

DE    3712551     11/1988
DE    19537683    4/1998
GB    1169050     10/1969

OTHER PUBLICATIONS

Kunz et al. DE 3712551. Nov. 3, 1988. English abstract by Derwent.*

*Primary Examiner* — James Lee
(74) *Attorney, Agent, or Firm* — Pearl Cohen Zedek Latzer Baratz LLP

(57) ABSTRACT

The invention relates to an activation device for an electric battery unit, in particular, for a battery part of a torpedo. The invention also relates to a battery unit with activation devices of this type.
An activation device incorporates an operating supply connection, to which an operating supply reservoir can be connected. A movably arranged cutting element can be pneumatically actuated via a pneumatic connection of the activation device by means of an actuation element, wherein a sealing element arranged in the path of travel of the cutting element controls the operating supply connection.
In order to guarantee a safe storage, ready for operation, and a safe activation of a battery unit, it is provided in accordance with the invention that the activation device incorpo-
(Continued)

rates a pneumatic outlet, which can be fluidically connected to the pneumatic connection, depending on the position of the actuation element.

10 Claims, 3 Drawing Sheets

(51) Int. Cl.
*F16K 17/40* (2006.01)
*H01M 6/50* (2006.01)
*F42B 19/24* (2006.01)
*F42B 19/00* (2006.01)
*H01M 6/04* (2006.01)

(52) U.S. Cl.
CPC ........... *H01M 6/38* (2013.01); *H01M 6/5038* (2013.01); *H01M 6/5072* (2013.01); *H01M 6/04* (2013.01); *H01M 2220/20* (2013.01); *Y10T 137/1767* (2015.04)

(58) Field of Classification Search
USPC .................................................. 429/110–118
See application file for complete search history.

(56) References Cited

U.S. PATENT DOCUMENTS

| | | | | |
|---|---|---|---|---|
| 5,076,312 A | * | 12/1991 | Powell | B60R 21/268 137/68.25 |
| 6,138,466 A | * | 10/2000 | Lake | B60H 1/00278 429/62 |
| 2013/0118707 A1 | * | 5/2013 | Kardos | B60H 1/00278 165/42 |

* cited by examiner

ACTIVATION DEVICE FOR AN ELECTRIC BATTERY UNIT AND ELECTRIC BATTERY UNIT WITH AT LEAST ONE ACTIVATION DEVICE

CROSS-REFERENCE TO RELATED APPLICATIONS

This application is a National Phase Application of PCT International Application No. PCT/DE2013/100141, International Filing date Apr. 18, 2013, published Dec. 19, 2013 as International Publication No. WO 2013/185750, which in turn claims priority from German Patent Application No. 10 2012 011 986.0, filed Jun. 16, 2012, all of which are incorporated herein by reference in their entirety.

FIELD OF THE INVENTION

The invention relates to an activation device for an electric battery unit, in particular, for a battery part of a torpedo. The invention also relates to a battery unit, in particular, a battery unit of a torpedo, with a battery cell section and multiple operating supply reservoirs connected to the battery cell section.

BACKGROUND

In order to supply a torpedo with electric power, a battery unit with a battery cell section or multiple battery parts is conventionally arranged in the torpedo. The battery cell section is an energy store in the form of an array of single electrical cells, a so-called stack. Here, the battery cell section comprises a large number of electrode plates connected to one another, which can be circular in shape, in order to be able to take advantage of the hull of the torpedo. In order to activate the battery unit, the battery cell section is filled with an electrolyte, generally an alkaline solution. The electrolyte and, if required, other operating materials such as coolant, are held ready in operating supply reservoirs, which are connected to the battery cell section.

Activation devices, which are connected to the respective operating supply reservoir by an operating supply connection, are provided for activation. To activate an electric battery, DE 195 37 683 C2 provides the oxygen feed after opening a shut-off valve, which is actuated by an external activation signal, with which a cutting unit is pneumatically actuated and electrolyte is expelled from an electrolyte tank. In the process, the oxygen is fed under pressure via a shut-off valve of the cutting unit and a piston located in the cutting unit piston is released, which, in turn, pierces a seal of the electrolyte tank and thus opens the electrolyte tank. Under the pressure of the oxygen, the electrolyte is pushed out of the electrolyte tank into the individual battery cells.

In the known device, the heat arising from operating the battery is dissipated by means of the cooling equipment of the individual battery cells. In the process, the coolant running through the cooling equipment is moved by a pump and introduced into a heat exchanger in a cooling system, which releases the heat outside into the seawater.

When the battery is activated, the controlled feed of the operating supplies must also be guaranteed after a longer storage period. The malfunction of the components, which are involved in the conveyance of operating supplies, can lead to an uncontrolled activation of the battery. For example, the activation of the battery by feeding an electrolyte into the battery cell section results in a rise in temperature, which, where there is a malfunction in the cooling or of other operating materials, can lead to excessive heating of the battery cell section and, under the right circumstances, to a battery fire.

SUMMARY

Underlying the present invention is the problem of creating an activation device for a battery unit, in particular, a battery unit of a torpedo, and a battery unit, which guarantee a safe storage, ready for operation, and a safe activation of the battery unit.

The problem is solved by an activation device in accordance with the invention comprising an operating supply connection, to which an operating supply reservoir can be connected, comprising a movably arranged cutting element, which can be pneumatically actuated by means of an actuation element via a pneumatic connection with the activation device, and comprising a sealing element arranged in the path of travel of the cutting element, which controls the operating supply connection, and the activation device comprising a pneumatic outlet, which, depending on the position of the actuation element, can be fluidically connected to the pneumatic connection. The problem is also solved by a battery unit with an activation mechanism.

An activation device for an electric battery unit incorporates an operating supply connection, to which an operating supply reservoir can be connected. An operating material for the electric battery is held ready in the operating supply reservoir.

The activation device also incorporates a sealing element, which the operating supply connection controls, wherein the activation device with the sealing element is attached to the operating supply reservoir in order to confine the operating material and hold it ready for the activation of the electric battery unit.

The activation device also incorporates a cutting element, arranged so as to be movable, which can be activated via a pneumatic connection by means of an actuation element, wherein the sealing element is arranged in the path of travel of the cutting element. If the actuation element of the activation device is pneumatically actuated, then the cutting element of the activation device is moved and cuts the sealing element arranged in its path of travel so that the operating supply connection is released. Thus, the operating material confined up to that point can be discharged from the open operating supply reservoir.

In accordance with the invention, the activation device incorporates a pneumatic outlet, which, depending on the position of the actuation element, can be connected fluidically to the pneumatic connection of the activation device. Thus, the activation pressure, with which the actuation element of the activation device is pneumatically actuated and the cutting element is released, are interconnected by the pneumatic connection, whereby a series connection of activation devices is possible. In accordance with the invention, the activation devices of multiple operating supply reservoirs are connected pneumatically in series in a battery unit, whereby the operating supplies reach the battery cell section in sequence. At the same time, due to the series connection of the operating supply reservoirs, it is ensured that an operating supply reservoir is only opened in each case if an operating supply reservoir arranged ahead of it in the series connection has already been open. Without opening an operating supply reservoir, the pneumatic operation of an operating supply reservoir following in the series connection and its activation device is precluded, whereby the risk of an uncontrolled activation of the battery unit due to the malfunction of individual activation devices is markedly reduced.

The activation unit is operated pneumatically, by means of a pressure reservoir, to which an operable sealing mechanism is attached. A working gas under static pressure, for example nitrogen, is provided in the pressure reservoir. When the sealing device is operated, the pressure reservoir is opened and the operating pressure is connected to the first of the activation devices connected in series.

In one advantageous embodiment, an operating supply reservoir containing electrolyte for the battery cell section is arranged behind an operating supply reservoir of a coolant circuit of the battery unit in the series connection of the respective activation devices of a battery unit. Thus, it is ensured that electrolyte can only enter the battery cell section and hence activate the battery at a point in time when the operating supply reservoir with the coolant has already been opened and it is ensured that the coolant circuit of the battery unit is operational.

In one advantageous embodiment, the pneumatic series connection of multiple activation devices it is given by a configuration of this type of arrangement of actuation element and pneumatic outlet of the activation device that the pneumatic outlet is located in a position of the actuation element, which is fluidically connected to the pneumatic outlet in the path of travel of the cutting element after the sealing element has been passed. The cutting element initially passes the sealing element on its path of travel and cuts the sealing element open so that the operating supply reservoir is opened. The actuation element, which is kinematically coupled to the cutting element to operate the cutting element, only releases the fluidic connection between the pneumatic connection and the pneumatic outlet of the device activation in accordance with the invention by means of the configuration of the arrangement of the actuation element and the pneumatic outlet in accordance with the invention after the cutting element has opened the sealing element. As a result, the operating pressure is connected through to the pneumatic outlet only after the operating supply connection has been opened. A further activation mechanism of another operating supply reservoir is actuated from there.

Advantageously, the actuation element incorporates an actuator piston or is designed in sections as an actuator piston, which bears the cutting element and operates the pneumatic outlet with its perimeter. Thus, the perimeter of the actuator piston overlaps the pneumatic outlet in the course of the path of travel of the actuator piston and, after the pneumatic outlet has passed, releases the fluidic connection between the pneumatic outlet and the pneumatic connection of the activation mechanism in accordance with the invention.

The pneumatic outlet and the pneumatic connection are advantageously fitted into a pneumatics housing, wherein the actuator piston divides the inside of the pneumatics housing into two spaces. Here, the actuator piston is advantageously guided in the pneumatics housing, wherein the pneumatic outlet is located in the path of travel of the actuator piston. Once the actuator piston passes the pneumatic outlet in the course of its working stroke, the pneumatic outlet and the pneumatic connection are located in the same space within the pneumatics housing so that there is a fluidic connection between the pneumatic outlet and the pneumatic connection, and the operating pressure is also in contact with the pneumatic outlet.

The cutting element is advantageously arranged inside a blade housing, which is fluidically separated from the pneumatics housing. Hence, there is a kinematic coupling of the actuator piston with the cutting element by means of a piston rod, which bears the cutting element at its end inside the blade housing.

Due to the kinematic coupling, the cutting element and its actuation element move along paths of travel equal in terms of length. In the process, however, the cutting element and the actuator piston move in separate spaces. Here, the sealing element, with which the cutting element works, is arranged on a first section of the path of travel along the length of the respective paths of travel of the cutting element and of the actuation element, while the pneumatic outlet, which controls the actuation element, is located on a second section.

Preferably, the piston extends through a partition between the pneumatics housing and the blade housing, wherein the partition incorporates a guide for the piston rod. As a result, the actuation element, and hence also the cutting element at the end of the piston rod, are guided precisely at multiple axial guide points, namely in the area of the actuator piston as well as by the piston rod guide. Moreover, sealing, i.e., a fluidic separation, can easily be arranged between the pneumatics housing and the blade housing in the area of the piston rod guide. Advantageously, the seal is essentially provided by an O-ring.

In one advantageous embodiment of the invention, the pneumatics housing and the blade housing are sections of a housing for the activation device. Here, the pneumatics housing and the blade housing can be designed as one piece in the housing of the activation device.

In a preferred embodiment of the invention, the operating supply connection of the activation device is arranged at the perimeter of the blade housing, wherein the sealing element is a sealing plug with a cap made from easily cut material, projecting inside the blade housing. Here, the cutting element has a cutting edge, which functions in the direction of the piston stroke of the actuator piston, adjacent to the inner wall of the blade housing. In an advantageous embodiment of the invention, the cutting element at the end of the piston rod is designed to be plate-shaped, wherein the edge, at least in one section associated with the sealing cap, is formed as a cutting edge. The blade housing is advantageously cylindrical in design, for example, with a circular cross-section, wherein the cutting element is guided in the blade housing with a corresponding contour.

The sealing plug establishes the operating supply connection of the activation device and is connected to the operating supply reservoir by its outward-projecting section. In the process, the exposed end section of the plug of the sealing cap can be firmly connected to the operating supply reservoir, for example, by gluing.

The sealing plug keeps the operating supply connection of the activation device solidly sealed, wherein, when the activation device is operated pneumatically, the cutting element separates the cap of the sealing plug projecting into the inside of the blade housing and thus instantaneously opens the operating supply connection.

In a further advantageous embodiment of the invention, a spring-loaded fixing pin is arranged in a housing of the activation device orthogonally to the longitudinal axis of the actuation element and is in contact with the lateral surface of the actuation element. At the same time, the actuation element has a detent opening to receive the fixing pin. Here, the detent opening is located in an axial position, which corresponds to the pneumatically actuated activation position of the blade element, i.e., in an axial position, in which the actuation element has already passed the pneumatic outlet and hence the pneumatic operating pressure is connected to the pneumatic connection. Due to the spring force acting on it, the fixing pin engages in the detent opening once the fixing pin is in an overlapping position with the detent opening, and thus prevents a backward movement of the actuation element and of the kinematically coupled cutting element in a direction of movement opposite to the opening movement. The detent opening is advantageously arranged in the lateral surface of the piston rod.

In a preferred embodiment of the battery unit in accordance with the invention, the operating supply reservoir of a coolant circuit has two connections for the intake and draining of coolant, to each of which an activation device is attached. Here, the activation devices of both connections are pneumatically connected in series so that the intake and draining of coolant and hence the serviceability of the coolant circuit is ensured. At the same time, further operating supply reservoirs connected in series can only be opened if the coolant circuit has been opened by operating both activation devices of the coolant circuit connected in series.

Advantageously, the activation device of the operating supply reservoir in the series connection containing the electrolyte is switched after the second activation device of the coolant circuit so that feeding the electrolyte is only possible if the circulation of the coolant is ensured.

Alternately or in addition, a thermostatic valve is provided to regulate the temperature of the battery by means of the coolant supply.

In a preferred embodiment of the invention, the coolant circuit has a coolant pump with a reversible direction of flow and incorporates two parallel line sections, permeable in opposite directions in one section, wherein a heat exchanger is arranged in one of the parallel line sections. Thus, the coolant can be directed through the heat exchanger in one of the two possible directions of flow of the coolant pump. By operating the coolant pump in an opposite direction of flow, the coolant is guided through the battery cell section in a short coolant circuit, bypassing the heat exchanger. Thus, by simple structural means, two coolant circuits are conveniently available for cooling the battery unit, namely a long coolant circuit through a heat exchanger and a short coolant circuit bypassing the heat exchanger. In operating the short coolant circuit, the battery cell section can be quickly heated to its operational temperature after the activation of the battery unit.

The heat exchanger is advantageously arranged next to a battery unit of a torpedo, on the outer hull of the torpedo, whereby an effective heat exchange is achieved by means of the cool seawater in the vicinity of the torpedo.

Advantageously, an operating supply reservoir containing electrolyte for the battery cell section is arranged at the end of the series of operating supply reservoirs in the series connection of the respective activation devices of a battery unit. Thus, it is ensured that the electrolyte, for example, an alkaline solution, can only enter the battery cell section if all other operating supply reservoirs of the battery unit have already been opened and the respective operating materials, in particular, coolant, are already available in the battery cell section. In the arrangement of the operating supply reservoir, electrolyte for the battery cell section, at the end of the operating supply reservoirs connected in series, the pneumatic outlet of the activation device of this operating supply reservoir is advantageously fluidically connected to an internal space of the operating supply reservoir containing electrolyte. Thus, the actuation element of the activation device connects the pneumatic opening pressure to the interior of the operating supply reservoir so that the pneumatic opening pressure flushes the electrolyte out of the operating supply reservoir and channels this to the battery cell section. A similar fluidic connection of the pneumatic outlet with the interior of the operating supply reservoir at the end of a series connection of multiple activation devices can also be provided for operating supply reservoirs with operating materials other than the electrolyte for the battery cell section. For example, where there are multiple separate switching circuits, in which multiple activation devices are pneumatically connected in series, the pneumatic outlet of the last sealing mechanism of the series connection can be pneumatically connected to the interior of a previous operating supply reservoir in the series in order to flush out its contents.

BRIEF DESCRIPTION OF THE DRAWINGS

Further characteristics of the invention will emerge from the subclaims and the exemplary embodiments outlined in more detail below with reference to the drawings. In the drawings:

DETAILED DESCRIPTION

Figure 1:
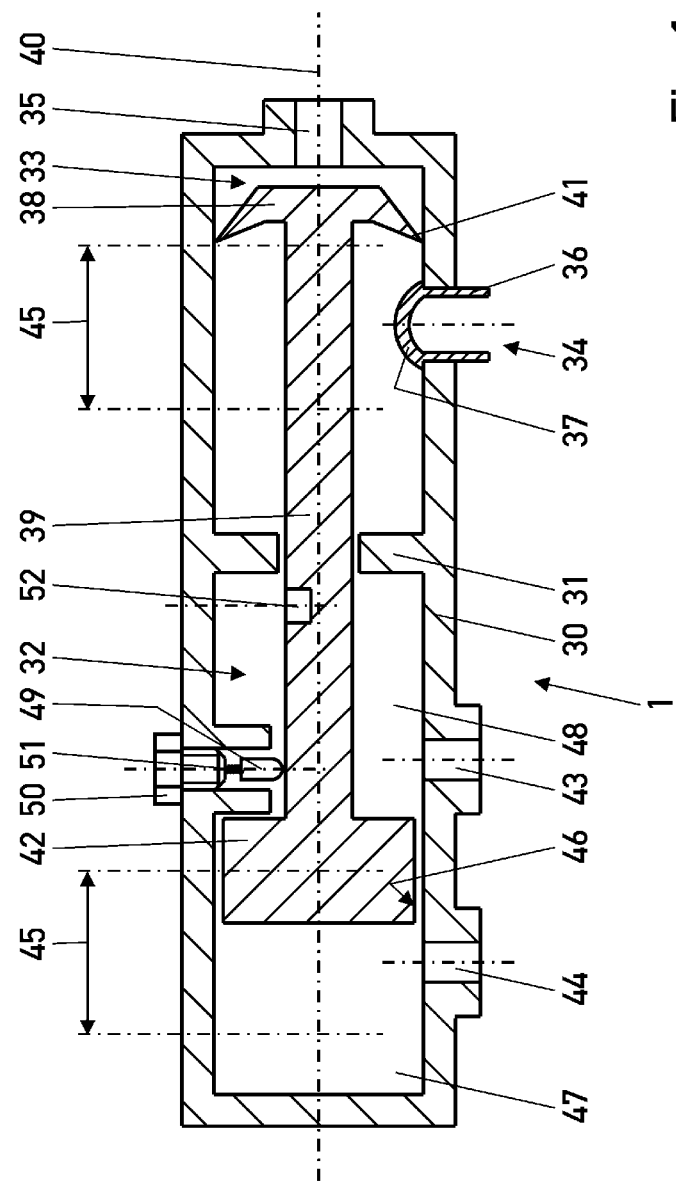
FIG. 1 is a cross-section of an activation device in the inoperative state.
Figure 2:
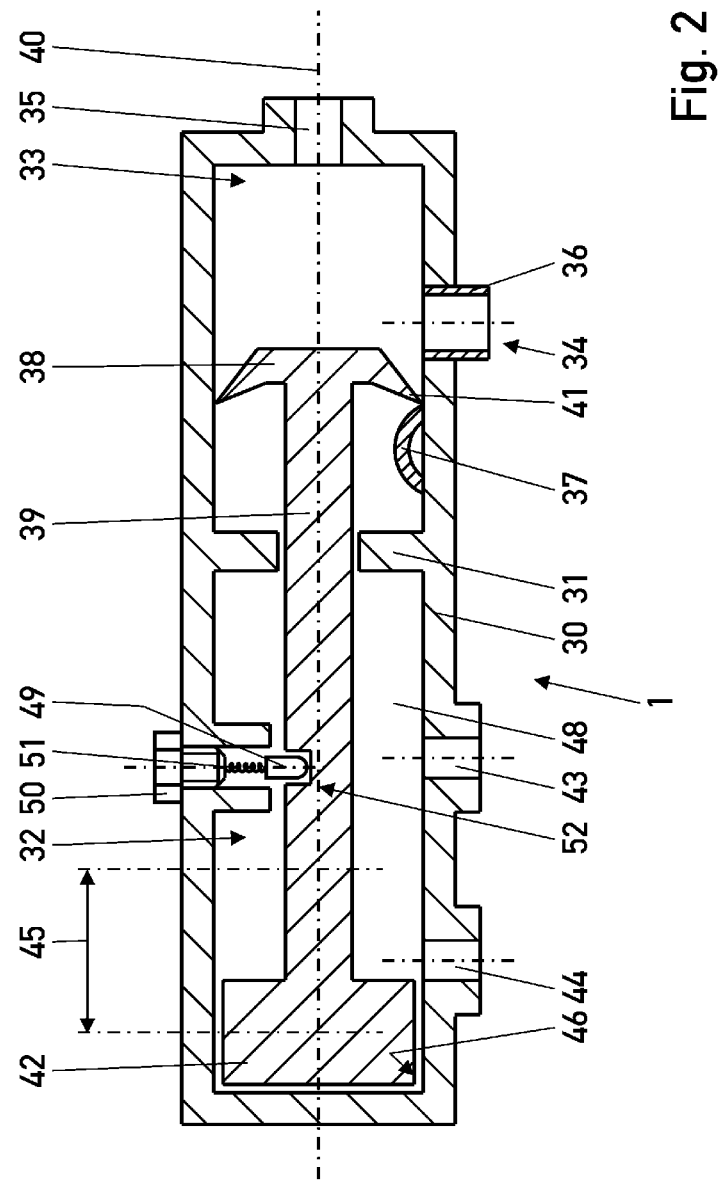
FIG. 2 depicts the activation device in accordance with FIG. 1 in the activation state.
Figure 3:
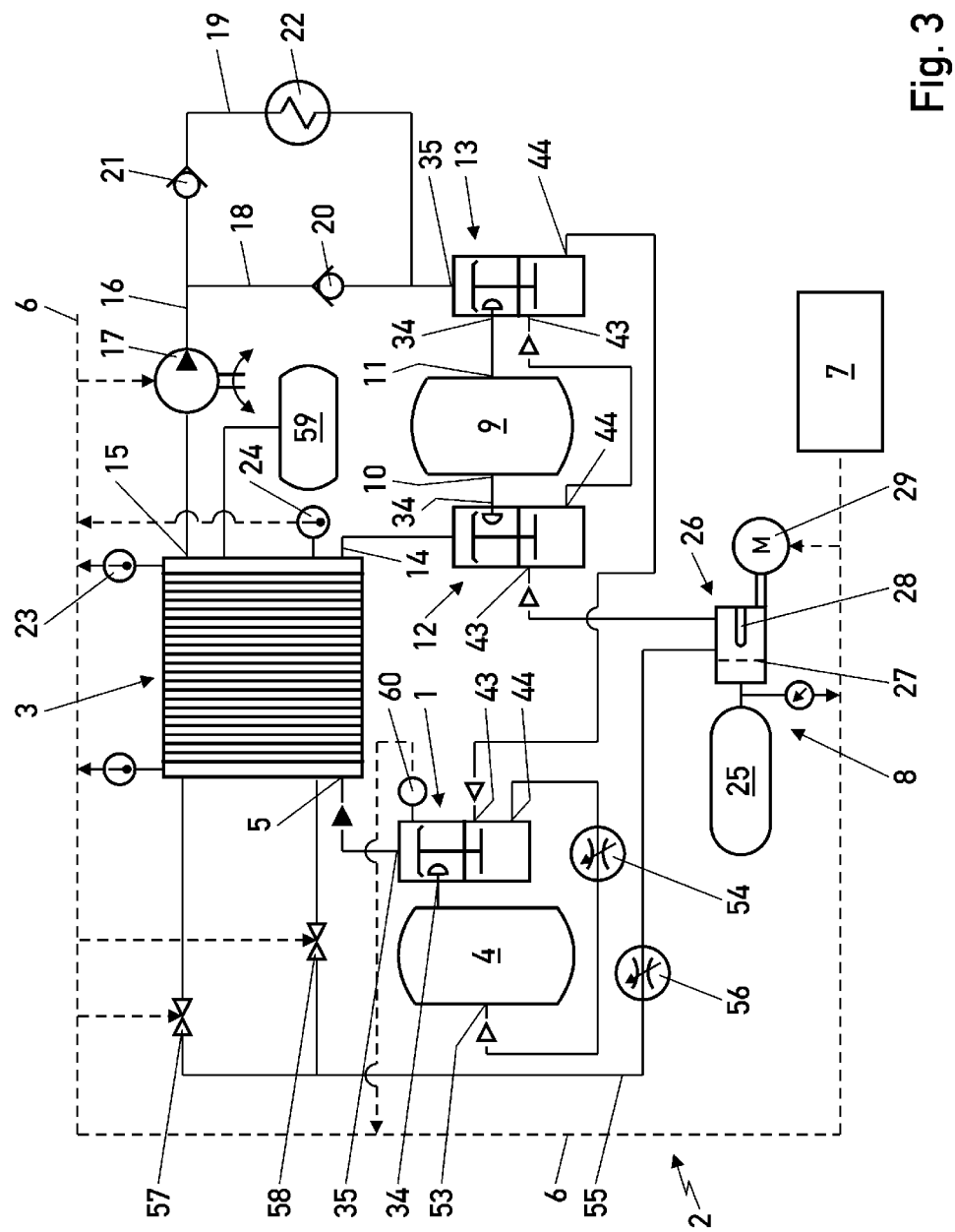
FIG. 3 is a pneumatic circuit diagram of an electric battery unit of a torpedo with activation devices in accordance with FIG. 1 and FIG. 2.

FIG. 1 and FIG. 2 are each cross-sections of an activation device 1 for a battery unit 2 (FIG. 3). A pneumatic circuit diagram of a battery unit 2 of a torpedo is depicted in FIG. 3, wherein the battery unit 2 is a battery part of the torpedo.

The battery unit 2 incorporates an energy store in the form of a battery cell section 3, which comprises a large number of electrode plates connected to one another. In the presence of an electrolyte, the electrodes form galvanic elements. The electrolyte, potassium hydroxide solution in the exemplary embodiment depicted, is provided in an operating supply reservoir 4, which is sealed by an activation unit 1 (FIG. 1, FIG. 2). After actuating the activation unit 1, the operating supply reservoir 4 is connected to an alkaline solution line 5 of the battery cell section 3 and the battery cell section 3 is filled with alkaline solution. The battery cell section is activated due to the presence of the alkaline solution and of another electrolyte.

Together with the battery cell section 3, the battery unit 2 incorporates a cooling system for the battery cell section 3, electronics 6 with a control unit 7 and a pneumatic actuator 8, with which the activation devices of the battery unit 2 can be pneumatically actuated.

The cooling system incorporates an operating supply reservoir 9, in which coolant is made available. Two connections 10, 11 of the operating supply reservoir 9 are each sealed by activation devices 12, 13, which release the connections 10, 11 when actuated and guarantee the intake and draining of coolant in a coolant circuit. Interconnected with the respective activation device 12, 13, the connections 10, 11 of the operating supply reservoir 9, filled with coolant, are connected to the battery cell section 3 by coolant connectors 14, 15. Thus, a coolant circuit 16 is created, in which a coolant pump 17 is arranged. The direction of flow of the coolant pump 17 can be reversed.

In addition, the coolant circuit 16 incorporates two parallel sections of line 18, 19, in one section, which are permeable in the opposite direction due to the corresponding arrangement of back pressure valves 20, 21 or fluid technology elements with a similar effect. Thus, depending on the active direction of flow of the coolant pump 17, the coolant flows through one of the two parallel sections of line 18, 19. Here, a heat exchanger 22 is arranged in one of the parallel sections of line 19, wherein the other section of line 18 forms a heat exchanger 22 bypass. The heat exchanger 22 is mounted on the outer hull of the torpedo and enables the coolant to be effectively cooled by heat exchange with the surrounding seawater. In the activation phase of the battery unit 2, the coolant is conducted through the short coolant circuit, i.e., through the section of line 18 bypassing the heat exchanger 22, thereby facilitating the rapid heating of the battery unit 2. After reaching the operating temperature of the battery unit 2, the direction of flow of the coolant pump 17 is reversed and, from that point, the coolant is conducted through the longer coolant circuit and the heat exchanger 22 arranged therein.

The coolant pump 17 is connected to the electronics 6 of the battery unit 2. The control unit 7 records the temperature of the coolant entering and the temperature of the coolant exiting by means of temperature sensors 23, 24 on the coolant connectors 14, 15 of the battery cell section 3, for the purposes of coolant management. Here, the coolant pump 17 is regulated depending on an analysis of the actual values of the coolant temperature, wherein, on the one hand, the direction of flow is temporarily reversed or the output is changed in order to modify the cooling capacity.

The pneumatic actuator 8 for the activation devices 1, 12, 13 incorporates a pressure reservoir 25, which is sealed by a sealing mechanism 26. The pressure reservoir 25 is a gas canister, in which a working gas, for example nitrogen, is provided under high pressure, for example, over 200 bar. The sealing mechanism 26 incorporates a sealing element 27, which seals the pressure reservoir 25 hermetically and can be opened by means of a pin or a puncture-top 28. The puncture-top 28 is driven by an electric drive motor 29, preferably via a spindle drive. In a preferred exemplary embodiment, the sealing element 27 is a membrane, which seals the pressure reservoir 25 hermetically and is pierced by the puncture-top 28 to activate the battery unit 2. To open the pressure reservoir 25, the control unit 7 transmits an appropriate electric signal to the drive motor 29 so that the drive motor 29 pierces the sealing element 27 with the puncture-top 28 and hence opens the pressure reservoir 25.

By opening the pressure reservoir 25, the working gas, trapped up to that point, is released, in order to be available for the pneumatic loads, in particular, to actuate the activation devices 1, 12, 13 of the operating supply reservoirs 4, 9 pneumatically. The activation device 1 of the operating supply reservoir 4 containing the electrolyte and the activation devices 12, 13 of the operating supply reservoir 9 containing coolant are structurally similar in design. The design and the mode of operation of the activation devices 1, 12, 13 is outlined in more detail in the following by reference to FIG. 1 and FIG. 2.

The activation unit 1 comprises a cylindrical housing 30, which is divided by a partition 31 into a pneumatics housing 32 and a blade housing 33. The blade housing 33 has an operating supply connection 34, which, in the activation device 1 installation position, is connected to a fluid connection of an operating supply reservoir. In the exemplary embodiment in accordance with FIG. 3, the operating supply connection 34 of the activation unit 1 for the operating supply reservoir 4 containing electrolyte is connected to its fluid connection. The operating supply connections 34 of the activation units 12, 13 of the operating supply reservoir 9 containing coolant are accordingly connected to the connections 10, 11 of this operating supply reservoir 9.

An operating supply outlet 35 is arranged on the front of the blade housing 33, through which operating material is discharged after opening the operating supply reservoir.

In the inoperative state of the activation device 1 depicted in FIG. 1, the operating supply connection 34 is sealed by a sealing plug 36, which has a cap 37 which projects into the interior of the blade housing 33. The sealing plug 36 is pushed through the operating supply connection 34 and, outside the housing 30 of the activation device 1, is connected to the respective operating supply reservoir by an impermeable fluid line or directly connected to the operating supply reservoir. In further exemplary embodiments, not depicted, the operating supply connection 34 is connected to the fluid connection of the operating supply reservoir by a pressure-proof screw connection such as a sleeve.

A cutting element 38 is arranged at the end of a piston rod 39 in the blade housing 33 and can be moved in the direction of the longitudinal axis 40 of the activation device 1 by means of the piston rod 39. The cutting element 38 is designed to be plate-shaped and is aligned orthogonally to the piston rod 39 so that a blade 41 at the periphery of the cutting element 38 can be moved next to the inner wall of the blade housing 33. As the sealing plug 36 passes, the blade 41 separates the cap 37 of the sealing plug 36 so that the operating supply connection 34 is released.

Together with the piston rod 39, an actuation element for operating the cutting element 38 incorporates an actuator piston 42, which is longitudinally conducted in the pneumatics housing 32. The pneumatics housing 32 has a pneumatic connection 43, which is connected to the pressure reservoir 25 (FIG. 3). Once the pressure reservoir has been opened to activate the battery unit, the operating pressure in the pressure reservoir operates on the actuator piston 42, which is displaced by the operating pressure. The activation device 1 also incorporates a pneumatic outlet 44, which, depending on the position of the actuator pistons 42, can be fluidically connected to the pneumatic connection 43. For this purpose, the pneumatic connection 43 and the pneumatic outlet 44 are arranged in different axial positions in the pneumatics housing 32, wherein the actuator piston 42 is depicted in FIG. 1, located in the initial position between the pneumatic connection 43 and the pneumatic outlet 44. Here, the pneumatic outlet 44 is located within the path of travel 45 of the actuator piston so that the actuator piston 42 controls the pneumatic outlet 44 by its perimeter 46.

In the inoperative state depicted in FIG. 1, the sealing plug actuator piston 42 inside the pneumatics housing 32 separates a section 47 with the pneumatic outlet 44 from a pressure chamber 48, into which the pneumatic connection 43 empties and which is hence placed under the operating pressure of the pressure reservoir after opening the pressure reservoir. If the actuator piston 42 45 passes the pneumatic outlet 44 in its path of travel, then the pressure chamber 48 also includes the pneumatic outlet 44. In this activation position, as depicted in FIG. 2, the pneumatic connection 43 and the pneumatic outlet 44 are fluidically connected to one another via the common pressure chamber 48 so that the operating pressure of the pneumatic connection 43 is connected to the pneumatic outlet 44.

The movement of the actuator pistons 42 is transferred via the piston rod 39 to the cutting element 38 at the end of the piston rod 39. In other words, the cutting element 33 is moved in the same path of travel 45 by the kinematic coupling with the actuator piston 42. The sealing plug 36 is arranged in the path of travel 45 of the cutting element 38, which controls the operating supply connection 34. Here, the sealing plug 36 and the pneumatic outlet with the cutting element 38 and the actuation element kinematically coupled to the cutting element 38 are in a configuration so that the cutting element 38 first crosses the sealing plug 36 and the actuator piston 42 then crosses the pneumatic outlet 44 in the path of travel 45.

Driven by the operating pressure in the pressure chamber 48, the actuator piston 42 draws the cutting element 33 over the sealing plug 36, wherein the blade 41 severs the cap 37 of the sealing plug 36 at the perimeter of the cutting element 38. The severed cap 37 is trapped in the blade housing 33 by the radial cutting element 38, apart from the opened operating supply connection 34 so that the accidental obstruction of the operating supply connection 34 by the severed cap fragment is precluded.

Aside from separating the pneumatics housing 32 from the blade housing 33, the partition 31 forms a guide for the piston rod 39. There is also a guide for the assembly formed by the actuation element and the cutting element over the radial cutting element 38, which extends to near the internal wall of the blade housing 33.

The activation device 1 is held in the activation position in accordance with FIG. 2 by a spring-loaded fixing pin 49. The fixing pin 49 is arranged in the housing 30 of the activation device 1 orthogonally to the longitudinal axis 40 and is in contact with the lateral surface of the actuation element. In the exemplary embodiment depicted, the fixing pin 49 is held on the lateral surface of the piston rod 39 by means of a screw 50 and a coil spring 51, recessed into a detent opening 52 in the piston rod 39, which is moved with the piston rod 39. Once the detent opening 52 has reached the axial height of the fixing pin 49 during the working motion of the actuation element, i.e., in particular, of the piston rod 39, the coil spring 51 pushes the fixing pin 49 into the detent opening 52. The engaged fixing pin 49 secures the cutting element 38 in the activation position in accordance with FIG. 2 so that an undesired return of the cutting element 38 into the area of the open operating supply connection 34 is precluded.

In the pneumatic circuit of the battery unit 2 in accordance with FIG. 3, the activation units 1, 12, 13 of the operating supply reservoirs 4, 9 are switched in a series connection. Here, in the sequence of the activation devices 1, 12, 13, the pneumatic connection 43 of a first activation device 12, corresponding with the cooling, is initially directly connected to the pressure reservoir 25 or its sealing mechanism 26. The pneumatic outlet 44 of this first activation device 12 is connected to the pneumatic connection 43 of the second activation device 13 of the coolant system. The pneumatic outlet 44 of the second activation device 13 of the coolant system is connected to the pneumatic connection 43 of the activation device 1 of the battery fluid containing the operating supply reservoir 4. Thus, it is ensured that the operating pressure for opening the operating supply reservoir 4 is connected and the battery fluid is released only when the connections 10, 11 of the coolant reservoir 9 in the series connection have already been opened and the coolant can circulate. At the same time, due to the kinematic coupling of the pneumatic actuation element and the cutting element, the activation devices 12, 13 with the setup outlined above in reference to FIGS. 1 and 2 guarantee that the operating pressure is connected through, to open the operating supply reservoir 4 containing the battery fluid pneumatically only after both activation devices 12, 13 of the coolant reservoir have been fully opened.

The pneumatic outlet 44 of the activation device 1 of the fuel reservoir 4 containing battery fluid is arranged at the end of the series connection of the activation devices 1, 12, 13 so that battery fluid can only enter the battery cell section 3 when all other operating supply reservoirs arranged in the series connection have been opened. The pneumatic outlet 44 of the activation device 1 of this operating supply reservoir 4 with battery fluid is connected to a reservoir connection 53 of the operating supply reservoir 4 and hence to the interior of the operating supply reservoir 4. A pressure regulator 54 is arranged in the line between the pneumatic outlet 44 and the reservoir connection 53, which reduces the operating pressure of the pressure reservoir 25 to a level advantageous for the extraction of the battery fluid from the operating supply reservoir 4, for example, to 5 bar. Once the activation unit 1 opens its operating supply connection 34 and hence pressurizes the reservoir connection 53 via the pneumatic outlet 44, the battery fluid is forced out of the operating supply reservoir 4 into the battery cell section 5 via the operating supply outlet 35 of the activation device 1.

In order to enable the battery cell section 3 to be quickly filled with battery fluid, a central alkaline solution feedline is provided, which is separated by means of separation sleeves after filling the individual battery cells. The separation sleeves and a spacing rod corresponding with the separation sleeves consist of an electrically insulating material, in particular, rubber. Undesirable heating, which could result in a battery fire, is prevented by the electrically insulating material.

In the process, the separation sleeves are inflated with working gas from the pressure reservoir 25 and hence the individual battery cells are insulated. A compressed air line 55 is connected to the pressure reservoir 25 via a pressure regulator 56, to supply the separation sleeve. The through-connection of the compressed air with the separation sleeves is secured by way of self-ventilating shut-off valves 57, 58, which can be controlled by the control unit 7 via the battery electronics 6. The pressure regulator 56 in the compressed air line 55 to the separation sleeves is adjusted to a greater operating pressure than the pressure of the alkaline solution according to the pressure regulator 54, for example, to 7 bar, prior to the operating supply reservoir 4. Thus, it is ensured that the separation sleeves can be inflated against the pressure of the alkaline solution.

The compressed air line 55 supplying the separation sleeves is coordinated with the pneumatic line, which includes the activation units connected in series 1, 1', 1", so that inflating the separation sleeves takes place prior to the pneumatic operation of the activation devices. Coordinating the time sequence of the supply of the separation sleeves and the operation of the activation units 1, 1', 1" (varying durations) in the process ensures that the separations have been inflated before battery fluid is injected into the battery cells. Thus, a controlled filling with alkaline solution is guaranteed and, in the case of an error, the uncontrolled flow of battery fluid into the battery unit is prevented.

A collection container 59 is connected to the battery cell section 3, to collect excess battery fluid.

A leak sensor 60 is attached to the activation device 1 of the operating supply reservoir 4 with the battery fluid, which detects the penetration of alkaline solution for example, where there are leaks in the sealing plug, and indicates these via the battery electronics 6 of the control unit 7. A leak can be identified in sufficient time during storage of the battery unit 2 and the activation devices 1 by the leak sensor 60.

All characteristics referred to in the foregoing description of the figures, in the Claims and in the introduction to the description can be applied, both individually and in any combination with one another. The disclosure of the invention is therefore not limited to the combinations of characteristics described or claimed. Rather, all combinations of individual characteristics should be viewed as having been disclosed.

The invention claimed is:

1. An activation device for an electric battery unit comprising:
   an operating supply connection configured to be connected to an operating supply reservoir,
   an operating supply outlet,
   a sealing element which controls the operating supply connection,
   a pneumatic connection,
   a pneumatic outlet,
   a movable cutting element, which is configured to be pneumatically actuated by means of an actuation element via the pneumatic connection,
   wherein the sealing element is arranged in the path of travel of the cutting element, and wherein the actuation element and the pneumatic outlet are arranged such that after the cutting element has moved past the sealing element the pneumatic outlet is fluidically connected to the pneumatic connection,
   the actuation element comprises an actuator piston which bears the cutting element, the pneumatic outlet is within a path of travel of the actuator piston, and the perimeter of the actuator piston operates the pneumatic outlet,
   the cutting element is arranged inside a blade housing at the end of a piston rod connected to the actuator piston, and the piston rod extends through a partition between a pneumatics housing and the blade housing, wherein the partition incorporates a guide for the piston rod.

2. The activation device in accordance with claim 1, wherein
   the actuator piston is guided in a pneumatics housing, which has the pneumatic connection and the pneumatic outlet, wherein the pneumatic outlet is located in the path of travel of the actuator piston.

3. The activation device in accordance with claim 1, wherein
   the operating supply connection is arranged at the periphery of the blade housing and the sealing element is designed as a sealing plug with a cap, projecting inside the blade housing.

4. The activation device in accordance with claim 1, wherein
   in a housing of the activation device, a spring-loaded fixing pin is arranged orthogonal to the longitudinal axis of the actuation element and is in contact with a lateral surface of the actuation element, wherein the actuation element has a detent opening in its lateral surface to receive the fixing pin in an axial position, which corresponds with a pneumatically actuated activation position of the cutting element.

5. A battery unit, comprising:
   a battery cell section and multiple operating supply reservoirs connected to the battery cell section, and activation devices corresponding with the operating supply reservoirs, wherein the activation devices are configured to be pneumatically actuated by means of a pressure reservoir of the battery unit, which is attached to an operable sealing mechanism;
   wherein the activation devices each comprise an operating supply connection configured to be connected to an operating supply reservoir, the operating supply connection comprising a movably arranged cutting element which is configured to be pneumatically actuated by means of an actuation element via a pneumatic connection with the respective activation device, and a sealing element arranged in a path of travel of the cutting element, which controls the operating supply connection;
   the activation devices each further comprise a pneumatic outlet, which, depending on the position of the actuation element, is configured to be fluidically connected to the pneumatic connection;
   each actuation element comprises an actuator piston which bears the cutting element, the pneumatic outlet is within a path of travel of the actuator piston, and the perimeter of the actuator piston operates the pneumatic outlet,
   each cutting element is arranged inside a blade housing at the end of a piston rod connected to the actuator piston,
   each piston rod extends through a partition between a pneumatics housing and the blade housing, wherein the partition incorporates a guide for the piston rod,
   and
   the activation devices of the operating supply reservoirs are pneumatically switched in a series connection.

6. The battery unit in accordance with claim 5, wherein
   in the series connection of the respective activation devices, an operating supply reservoir containing electrolyte for the battery cell section is arranged behind an operating supply reservoir of a coolant circuit of the battery unit.

7. The battery unit in accordance with claim 6, wherein
   the operating supply reservoir of the coolant circuit has two connections, for the intake and draining of coolant, to each of which an activation device is attached, wherein the activation devices of both connections are pneumatically connected in series.

8. The battery unit in accordance with claim 6, wherein
   the coolant circuit comprises a coolant pump with a reversible direction of flow and, in one section, two parallel line sections, through which coolant can flow in opposite directions, wherein a heat exchanger is arranged in one of the parallel line sections.

9. The battery unit in accordance with claim 5, wherein
   in the series connection of the respective activation devices, an operating supply reservoir containing electrolyte for the battery cell section is arranged at the end of the series of the respective activation devices.

10. The battery unit in accordance with claim 9, wherein
    the pneumatic outlet of the activation device of the operating supply reservoir containing electrolyte for the battery cell section is fluidically connected to an internal space of the operating supply reservoir.

* * * * *